Patented Dec. 2, 1930

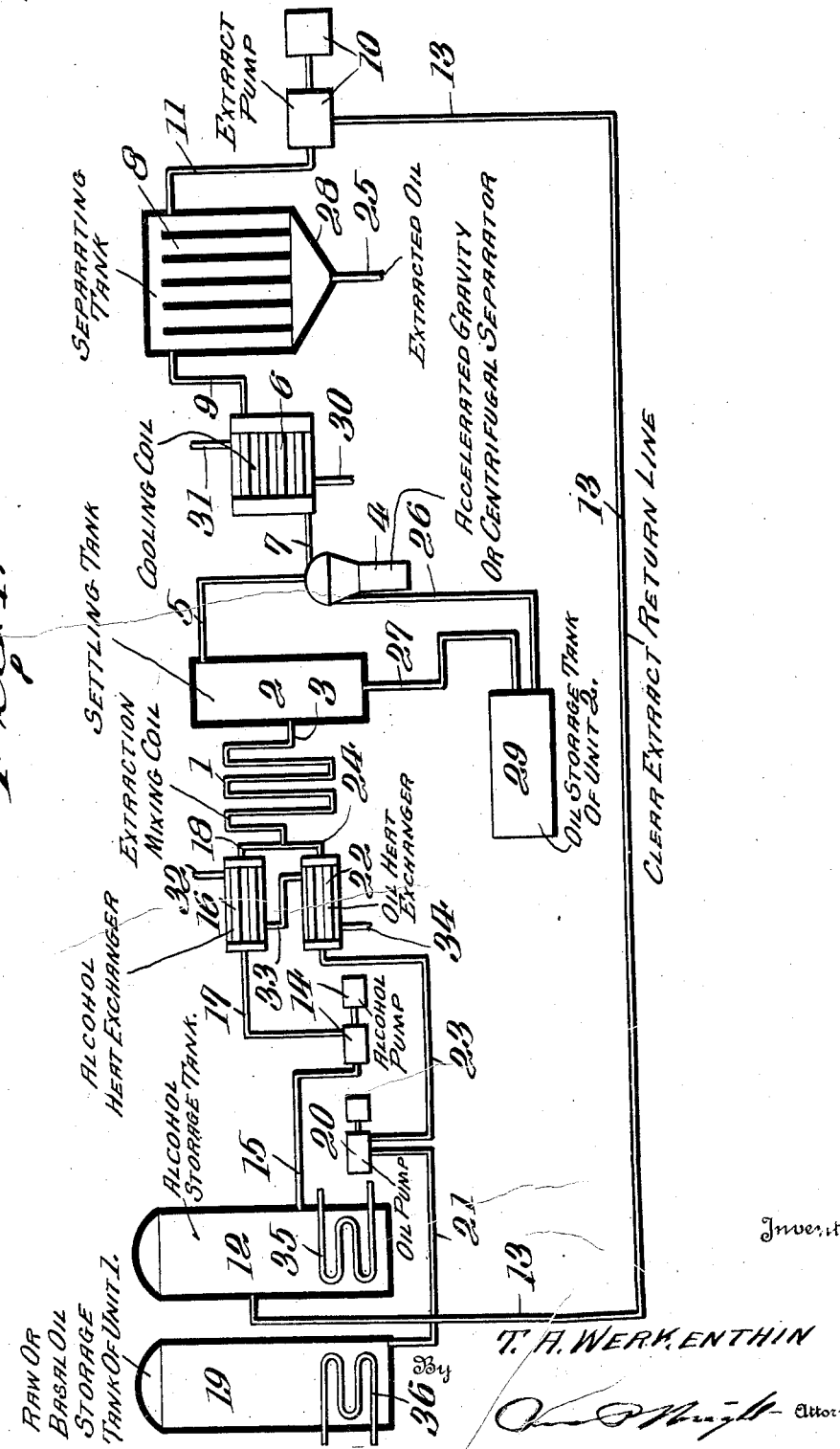

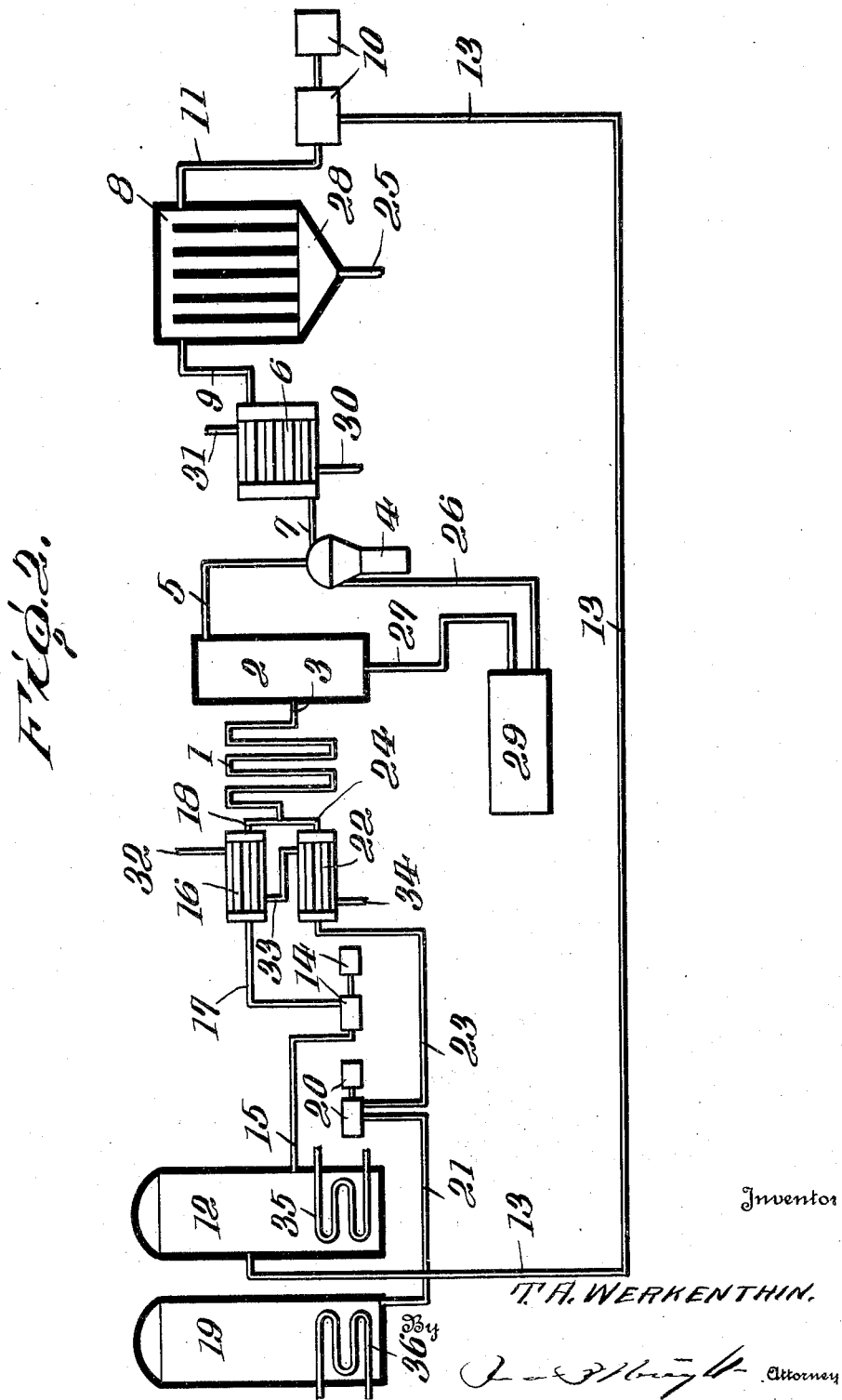

1,783,203

UNITED STATES PATENT OFFICE

THEODORE A. WERKENTHIN, OF LIMA, OHIO, ASSIGNOR TO THE SOLAR REFINING COMPANY, OF LIMA, OHIO, A CORPORATION OF OHIO

PROCESS OF AND APPARATUS FOR THE FRACTIONAL EXTRACTION OF PETROLEUM HYDROCARBONS WITH ALCOHOL

Application filed December 30, 1927. Serial No. 243,644.

My invention relates to a process of and apparatus for the fractional extraction of petroleum hydrocarbons with alcohol.

In application, Serial No. 750,783, filed Nov. 19, 1924, copending with the present application and now Patent No. 1,680,352, granted August 14, 1928, I have disclosed the treatment of petroleum hydrocarbons with alcohol whereby by fractional extraction there are obtained various desirable products including cracking stock and various grades of lubricating oils. In the process there set forth, the oil is introduced into a extraction tank where it is treated with alcohol. The reaction product is then passed into a settling tank to allow any undissolved oil which may have been carried along mechanically to settle out. The oil extract is thereafter passed into a still where under heat treatment the extraction product separates into two components, alcohol and oil. The alcohol is passed into a condenser, dehydrated and reused. The original stock from which an initial extraction product has been obtained is thereafter repeatedly subjected to the same treatment to produce a series of products.

The oils produced by the above process have good color and possess splendid crystallizing properties whereby their wax-content may be removed. However, I have discovered that the oils will have a better color, without acid treatment, and their crystallizing property will be distinctly improved by subjecting the alcohol extraction product to a cooling treatment instead of to distillation, whereby the oil is separated from the alcohol.

I have also discovered that it is desirable to allow the various oils produced by the extraction process to retain a small quantity of alcohol, as I hereafter set forth more fully. Oils containing a small quantity of alcohol have a remarkable low viscosity, enabling them to be easily pumped and otherwise handled. However, the most important result flowing from the presence of a small amount of alcohol is the influence it exerts upon the crystallizing properties of the wax present in the oil. Oils carrying a small quantity of alcohol have remarkably fine crystallizing properties.

My process of fractional extraction with alcohol is particularly applicable to:

1. Topped crude oil which I define as asphalt or paraffin base or mixed asphalt-paraffin base crude oil which is partially or totally deprived, either by natural or artificial means, of any one or all of the following fractions: natural gasoline, kerosene, gas oil, cracking stock, fuel oil, and heavy distillate. Besides topped crude oil as defined above, I may use the following oils for fractional extraction with alcohol, 2. Wax bearing distillate, 3. Wax bearing residual oils, 4. Heavy hydrocarbon residual fuel oils which have not been vaporized or distilled, and 5. Spent or used internal combustion engine lubricating oil.

6. Heavy residual oils resulting from either pyrolytic disruption or polymerization of petroleum hydrocarbons or both.

In carrying out my invention any of the above-mentioned oils may be utilized as the starting material from which any or all of the following may be selectively extracted therefrom with alcohol: cracking stock, waxes, different grades of lubricating oils and residual oils. Any one of the above oils may be extracted with alcohol so as to first dissolve the most soluble components which generally constitute the cracking stock. Thereafter, the remaining oil which has been deprived of the cracking stock is repeatedly subjected to an alcohol-extraction treatment to produce a series of lubricating oils of remarkably high character; waxes notable for their good crystallizing qualities; and a residuum or asphaltic substance. This residual oil furnishes an ideal binder material free from grit and impurities. The entire process is carried out at a relatively very low temperature the specific temperature employed being determined somewhat by the character of the material undergoing treatment. To furnish the necessary heat steam coils are preferably employed and the extract is maintained at a temperature that may vary, but usually ranges from 100° F. to the boiling point of the solvent or alcohol. It is desirable to maintain such a temperature as will insure a high degree of solubility of the oil in the alcohol. In practice, it has been found that the temperature range mentioned gives satisfactory results. However, the lower temperature employed will vary somewhat depending on the character of the oil. Therefore, while in the preferred form of my invention, the temperatures set forth are employed, it is desired to indicate that broadly, I do not wish to be strictly held within these limits. Some variation therefrom may be allowed, and the same will still come within the spirit of my invention.

The alcohol may be mixed with the oil to be extracted either in liquid form or in the vapor form. The oil to be extracted may be introduced in either the liquid, solid. or vapor form, although the liquid form of the oil is the most convenient and desirable one to use.

Apparatus suitable for carrying out my invention is illustrated in the accompanying drawings in which Figures 1 and 2 are elevations of successive extraction units.

The apparatus set forth in Figure 1, which for convenience will be referred to as unit 1, will be described in detail. Figure 2 shows a successive extraction unit similar to extraction unit 1 and will be referred to as unit 2. Units 3 and 4 substantially identical with unit 1 are usually employed. In view of their substantial identity, it is not necessary to have these latter units appear on the drawing. The size of the members in units 1, 2, 3 and 4 differ somewhat from those of unit 1 but otherwise there are no essential differences between the various units, and therefore, the description of Figure 1 will serve for the others. Referring to Figure 1, unit 1 comprises an extraction-mixing coil 1, and a settling tank 2 connected by the conduit 3. The settling tank is connected to an accelerated gravity or centrifugal separator 4 by the conduit 5.

The cooling coil 6, which receives the clear extract solution of oil in alcohol, is connected with the centrifugal separator 4 by means of the conduit 7 and by conduit 9 with the separating tank 8 in which the dissolved oil settles out due to the decreased solubility of the oil in the alcohol on decrease in temperature. The separating tank 8 is provided with an overflow conduit 11 which is in operative communication with the pump 10, this pump functioning to return the alcohol, by means of the conduit 13, to the alcohol storage tank 12. The storage tank is in operative communication with extraction-mixing coil 1 by means of the alcohol pump 14, the alcohol heat exchanger 16 and conduits 15 and 17, respectively. The oil to be treated or extracted is contained in the oil storage tank 19 and is in operative communication with the extraction-mixing coil 1 by means of an oil pump 20, oil heat exchanger 22 and conduits 21, 23 and 24, respectively.

The extracted oil which drops out of solution in the separating tank 8 is removed as it accumulates on the bottom 28 thereof into a suitable storage tank by means of the conduit 25. The undissolved oil which accumulates in the bottom of the settling tank 2 and that discharging from the accelerated gravity or centrifugal separator 4 is conveyed to the oil storage tank 29 of succeeding unit 2 by means of conduits 27 and 26. The cooling coil 6 is provided with a conduit 30 for receiving a cooling medium such as cold water, brine, cold alcohol or an ammonia solution. The cooling solution passes out of the cooling coil 6 by means of a conduit 31.

The heat exchangers 16 and 22 may be heated by a hot liquid or vapor entering at 32 and passing from one heat exchanger to the other by a conduit 33. The heating medium passes out of the heat exchanger 22 by means of the conduit 34. Exhaust steam, hot oil, or hot water may be used as a circulating medium in the heat exchangers 16 and 22, respectively. The raw oil storage tank 19 and the alcohol storage tank 12 are preferably kept at a uniform heating temperature by means of heating coils 35 and 36.

The process may be carried out as follows: Any of the oils previously mentioned may be introduced into the system. If a paraffin base oil or mixed paraffin-asphalt base oil is used, the extracted fraction of oil may be chilled in order to recover the wax or solid paraffin, but if an asphalt base oil is used, the latter may be directly introduced into the system without any subsequent treatment of the oils other than color treatment. The oil is pumped from the raw oil storage tank 19 by means of a pump 20 into the heat exchanger 22 through the conduits 21 and 23.

In the heat exchanger 22, the oil is heated to the desired temperature. As indicated, this may vary considerably between rather wide limits. However, a temperature of 165° has been found to give satisfactory results. The heated oil is then passed by means of conduit 18 to the extraction-mixing coil 1. Alcohol is passed from the storage tank 12 by means of the pump 14 to the alcohol heat exchanger 16 where it is heated to approximately the same temperature as the oil. The alcohol passes into the mixing coil 1 when the extraction or solution of the oil occurs. The extracted oil extract or the dissolved oil extract and the undissolved oil are released into a settling tank 2 where the bulk of the undissolved oil settles out. The dissolved oil extract, together with the remaining undissolved oil in mechanical contact with it, passes into the accelerated gravity or centrifugal separator 4 where the remaining undissolved oil is separated from the extract and is removed through the conduit 26. This clear extract is passed through a cooling coil 6 which is cooled by any suitable agent. The drop in temperature from the extraction temperature to that approximating the temperature of the cooling medium surrounding the cooling coil greatly decreases the solubility of the oil in the alcohol so that there is temporarily formed a super-saturated solution of oil in alcohol, allowing the greater part of the extracted oil to separate or precipitate from the alcohol until nearly all extracted oil has settled out.

The cooling step is preferably carried out at a temperature between 50° to 45° F. Lower temperatures can be employed and a more complete separation of the oil and alcohol will occur. However, this is counterbalanced by a partial settling out in the cooler of the wax which is somewhat objectionable. After extensive experiments, I have found that satisfactory results are obtained by employing the temperature set forth and this preferably should not vary more than 5° F. above or below. The mixture of the cold oil and the alcohol extract is passed into the separating tank 8 which is preferably a shallow settling tank provided with a baffle arrangement to allow the precipitated oil to completely separate from the alcohol. The clarified alcohol extract is returned to the alcohol storage tank 12 by the pump 10 through the conduits 11 and 13. The alcohol extract contains a small amount of dissolved extracted oil which remains in solution in spite of the decreased solubility due to a drop in temperature. The precipitated extracted oil which sinks to the bottom of the separating tank 8 is allowed to accumulate and is drawn into a suitable storage tank through the conduit 25. The undissolved oil separated in the accelerated gravity or centrifugal separator 4 passes through the conduit 26 into the undissolved oil storage tank 29 which is the starting oil for the next succeeding unit. The undissolved oil in the settling tank 2 is withdrawn into tank 29 through the conduit 27.

The undissolved oil in the storage tank 29 from which the cracking stock has been removed in unit 1 now undergoes a similar process of extraction in unit 2 which extracts the light lubricating oil components. The dissolved oil extract produced in the extraction-mixing coil of unit 2 passes into a settling tank of unit 2 similar to that of unit 1 together with the undissolved oil. The extract and the remaining undissolved oil pass into an accelerated gravity or centrifugal separator where the remainder of the undissolved oil is separated. The alcohol is separated from the dissolved oil in the extract by cooling just as in unit 1. The extracted oil collected in the separating tank of unit 2 is a light lubricating oil, having the characteristics later referred to, sinks to the bottom of the baffled separating tank and is withdrawn as it accumulates just as in the first unit. The alcohol is returned to the alcohol storage tank of unit 2 by means of a pump and the cycle of operation is repeated over and over again. The amount and the extent of extraction is dependent upon and is proportional to the time of contact, the area of oil exposed, the ratio of oil to alcohol, the temperature of extraction and the type of oil to be extracted. Stated differently, the average oil extracted in unit 2 is made up of all the various constituents from the more soluble to those somewhat less soluble, such that the average composition is a fraction termed light lubricating oil because its properties resemble such. The remaining undissolved oil deprived of its cracking stock components and light lubricating oil components is stored in the oil storage tank of unit 3 to be extracted in the extraction-mixing coil of unit 3 which is similar to the other two units described. In unit 3 the lubricating oil of a consistency of and having properties resembling those of a commercial grade of medium grade lubricating oil is extracted in exactly the same manner as in the preceding two units. The undissolved oil accumulated in the settling tank and derived from the accelerated gravity or centrifugal separator or unit 3 passes into the oil storage tank of unit 4 where heavy lubricating oil of high viscosity may be extracted. The process or cycle of extraction-operation in unit 4 is similar to that of the preceding units. The residuum or remaining oil from the last extraction will in general be of the nature of asphaltum, its precise qualities depending on whether asphalt base oil or paraffin base oil or mixed paraffin asphalt base oil was used in the process of extraction. The carbon content of the residuum asphaltum will be directly proportional to the carbon content of the basal oil extracted, that is, all the free carbon is apparently left behind in the residuum as no free carbon is extracted with alcohol. The method of alcohol extraction is therefore applicable to the separation of lubricating oil from solid or suspended free carbon or other impurities that the oil to be extracted may contain. In some cases it is desirable that the number of units employed in the extraction process be decreased or increased so that different grades of oil may be produced. This adaptability and flexibility of my invention constitutes one of the major advantages because any desired series of extractions may be carried out resulting in the separation of the original oil, whichever one of those mentioned may have been selected, into such fractions as may be deemed desirable. The properties, nature, and quantities of the different products obtained by the extraction process set forth are naturally dependent on the original molecular composition of the basal oil used in the extraction process but a typical example of the materials obtainable by the extraction process is the following: As a basal stock, a heavy fuel oil of gravity 17.5° Bé., flash at 200° F. is used. This stock is subjected to the extraction process as set forth. The more soluble components are dissolved first by the alcohol.

The oil extracted in unit 1 is a light oil amounting to only 10% of the amount of oil introduced into the system. It will have a gravity of 25.6° Bé., a viscosity of 75 to 80 seconds Saybolt at 100° F., a flash point of 200° F., a fire point of 230° F. and a cold test of 36° F. This stock is suitable for very light spindle oils but as it is usually constituted or composed of the oxygen and sulphur bearing compounds in the oil it is not desirable for lubricating oil stock. It is possible to use this oil without completely recovering the traces of alcohol after it is drawn off the extraction unit.

Light lubricating oil is produced in unit 2 to the extent of 15% of the basal oil introduced into the system. It has a viscosity of 150-200 seconds Saybolt at 100° F. and a gravity of about 25° Bé., a flash point of 340° F. and a fire point of 370° F.

This oil after color treatment is suitable for the lighter grades of lubricating oils. Its wax content is well crystallizable and therefore its removal is easy, resulting in a low chill oil.

The third and most important product of the extraction process is an oil of 295-310 seconds Saybolt viscosity at 100° F. This is a high grade of lubricating oil and forms 25% of this particular oil charged into the system. It has a flash point of about 430° F. and a fire point of 480° F. It has a remarkably high gravity of 26° Bé.

This oil will also require a chilling or pressing as it contains wax but zero cold test can easily be obtained by one pressing. An example of the medium lubricating oil is as follows:

Gravity, 26.1° Bé.,
Flash, 430° F.,
Viscosity, 315 seconds at 100° F., and
Cold test (after pressing), 2° F.

The fourth product which results to the extent of 15% of the particular oil charged does not necessarily have to be separated but may be included in the product of the third unit if desired, thereby raising the viscosity of the medium lube oil. The viscous oil from unit 4 has a viscosity of from 500 to 650 seconds Saybolt, a gravity of about 25.7° Bé., a flash point of 493° F. and a fire point of 551° F. This high viscosity, high gravity oil requires the same treatment for finishing as does the oil produced in unit 3. An example of the heavy lubricating oil obtained is as follows:

Gravity, 25.7° Bé.,
Flash, 490° F.,
Viscosity, 596 seconds Saybolt at 100° F.

This lubricating oil has to be cold pressed and it is to be especially noted that all of these viscous oils are cold pressed in the presence of from 1 to 3 percent of alcohol, both to render them less viscous and to aid the wax crystal formation during chilling. It is, of course, obvious that this percentage of alcohol can be varied, depending upon circumstances, and the example given is by way of illustration and not limitation.

One of the advantages of the modified extraction process as set forth is that the separation by cooling rather than distillation results in a better colored oil without acid treatment. The cold pressing of the oils is carried out just as is usual in cold pressing lubricating oil stock, but as the extracted oils as they come from the extraction units, contain a small quantity, anywhere from one-quarter of 1% to three percent of alcohol, but preferably one to three percent, they have a remarkably low viscosity due to these traces of alcohol and can be easily pumped and otherwise handled. But the most important feature possessed by all extracted oils produced by this process is their remarkably fine crystallizing qualities. All of the extracted oils, which are derived from paraffin or mixed paraffin-asphalt basal oils, when chilled for wax extraction purposes show a crystallization of wax of good firm crystals. There is no formation of the so-called "amorphous wax" which is apparently nothing more than wax prevented from crystal-formation due to the presence of a disturbing colloidal substance. Whether the presence of the solvent in the process-extracted oils counteracts the influence of such a colloid, or whether the colloid is left behind in the residuum, or whether the action of the alcohol-extraction destroys this disturbing colloidal substance which interferes with crystallizing qualities is not known, but the facts are that the extracted oils show excellent crystallizing qualities throughout, making the wax-pressing operation especially easily carried out, and resulting in a separation of wax and oil which leaves both the wax and oil in a much purer state than has hitherto been achieved in the art of paraffin wax making due to, (1) the lessened viscosity of the oils and, (2) the excellent crystal formation during chilling of all the extracted oils which have been derived from any of the types of oils previously mentioned derived from paraffin or mixed asphalt-paraffin base oils. After the desired color has been obtained and the oil freed of its paraffin content, the remaining traces of alcohol may be removed to restore the viscosity as disclosed in application Serial No. 71,112, filed Jan. 21, 1926.

The residuum or asphalt comprises about 35% of the particular fuel oil charged into the system and is best converted to true asphalt by blowing to produce the desired consistency. At 100° F. this residuum-oil flows very slowly, has a shiny black appearance and is sticky to the touch. A remarkable feature of the asphalt is that only a small percent of free carbon is present unless found in such fine colloidal suspension that it does not show up when the mass is dissolved in benzine and filtered.

Any of the standard methods for dehydrating alcohol may be employed to obtain the anhydrous product used in the process or the alcohol may be bought already anhydrous in the market. Only the initial amount required for the process is large, and the amount required later on is just that needed to replace the slight loss due to evaporation from the continuous closed system. In order to insure the anhydrous nature of the alcohol as it is kept circulating around in the continuous system described in this application, it is desirable to circulate portions of alcohol contained in the storage tank to a small still equipped with a vapor dehydrator as described in co-pending application Serial No. 243,643, filed of even date herewith. The alcohol when circulated through the system needs no purification unless dehydrating the traces of water that are carried along with the alcohol may be spoken of as purification. One of the advantages of the present process is that the alcohol needs no troublesome process of revivifying and can be used an indefinite length of time. It is desired to indicate that the total yield of lubricating oils obtainable when using my process will be almost two and one-half times the usual quantity obtainable with the overhead distillation processes now in use. On the other hand, if it is not desired to produce such a large amount of lubricating oils my process nevertheless represents the most economical method of producing cracking stock for the pressure stills. The contention of superior quality oil produced by my process is based upon the following consideration: The light gravity oil produced contains a homogeneous series of hydrocarbons that, as shown by a series of carbonization tests and practical lubrication tests, will withstand high temperature better, and with a production of less carbon than the oils obtained by ordinary distillation.

Substances may have almost identical boiling points and differ in other essential properties. The state of affairs occurs without end in organic chemicals and also applies to components of crude petroleum. Thus, two substances may have identical vaporization temperatures yet may differ widely in the temperature at which decomposition occurs. The differential solubility of the components of petroleum oil in alcohol greatly eliminates this.

The total value of all the products produced in the process as compared with the total value of the products ordinarily produced will show a good margin in favor of my process.

Another big factor of economy of the process is the construction of the various units. As there is substantially no pressure on them, they may be of light construction effecting a great saving of material in the structural and foundation as well as in the boiler construction. The highest temperature experienced in the process will be the boiling point of the anhydrous alcohol which is never more than 212° F.

Furthermore, no fire of any kind is in contact or in the vicinity of the oil or alcohol during the operation of the process; thus giving a reduction in the fire hazard with a corresponding saving on the insurance rates. To a large extent the fuel consumption and power production may be centralized, and by the use of steam, the process may be made entirely automatic since the temperature control of the extractor units and the rate of flow of the oil through the system can be, and in practice are, automatically regulated.

Methyl, ethyl, propyl and iso-propyl alcohol or mixtures of these alcohols may be used as the extraction medium. These alcohols should be anhydrous or substantially so. For example, satisfactory results have been obtained by using anhydrous alcohol of 99.5% strength. Theoretically, it is possible to carry out the extraction process with alcohol of lower strength. However, when the principle of alcohol extraction is applied in large scale operation, it has been found that the use of a lower strength alcohol is not practical.

Summarizing, it may be stated that my extraction process has the following advantages. (1) The process is remarkably economical as compared to the prior art methods of recovering the alcohol. Heretofore it has been customary to distill the alcohol from the oil dissolved in the extraction product. Instead of distilling the alcohol from oil dissolved therein, the extraction product is cooled and consequently there is a saving of heat equivalent to the heat or vaporization of alcohol. Inasmuch as the extraction temperature employed never exceeds the boiling point of the alcohol, the only heat required is that necessary to raise alcohol from a cooling temperature varying from 50° to 70° F, to the extraction temperature. (2) The step of extracting the mixture instead of distilling it has been found to aid the crystal formation of the wax in the oil. In this connection it may be stated that if any of the oils previously mentioned are subjected to alcohol extraction, and if a portion of the extraction product is distilled to recover the oil and alcohol, and the other portion is cooled to recover the components, it will be found that the portion that was cooled to separate the components gives an oil in which crystal formation of the wax is distinctly better than that in the oil which has been subjected to the distillation step. (3) The oil extracted by my new process having a cooling step requires less treatment to obtain the same color than oils which have been extracted by the processes of the prior art. (4) In comparing my present process to those which employ distillation, it is noted that the loss of solvent is only one-third of the earlier processes. (5) The alcohol maintains its water-free anhydrous state much longer than in the prior art processes employing a distillation step. This materially aids in reducing the cost of up-keep.

In carrying out my invention, the extraction element in this case, the extraction coil, and the mixing coil may be provided with automatic temperature controls, as set forth in my copending application, Serial No. 243,646 for the process of fractional extraction of petroleum hydrocarbons with alcohol, filed of even date herewith.

What I claim is:

1. The process of treating heavy petroleum oils comprising successively extracting the same with alcohol at an elevated temperature from 100° F. to the boiling point of the alcohol whereby there is insured a high degree of insolubility of the oil in the alcohol, thereafter cooling each successive alcohol extraction product to a low temperature substantially as set forth, to decrease the solubility of the oil in the alcohol and permit the oil to settle out, the cooling being carried out so as to allow about 1 to 3% of alcohol to be retained in the oil to decrease its viscosity, permitting it to be easily pumped, and cold pressing the oil in the presence of the retained alcohol whereby the crystal formation of the wax is improved.

2. The process of treating heavy petroleum oils comprising successively extracting the same with alcohol at an elevated temperature not exceeding the boiling point of the alcohol whereby there is insured a high degree of insolubility of the oil in the alcohol, thereafter cooling each successive alcohol extraction product to a low temperature substantially as set forth, to decrease the solubility of the oil in the alcohol and permit the oil to settle out, the cooling being carried out so as to allow about 1 to 3% of alcohol to be retained in the oil to decrease its viscosity, permitting it to be easily pumped, and cold pressing the oil in the presence of the retained alcohol whereby the crystal formation of the wax is improved.

3. In the process of extracting heavy petroleum oils with alcohol, the step of cooling the alcohol extraction product so as to allow the oil settling therefrom to retain 1 to 3% of alcohol whereby the viscosity of the oil is decreased, permitting it to be easily pumped, the crystal formation of wax being improved when the oil is cold pressed.

4. The process of treating a wax bearing distillate comprising successively extracting the same with alcohol at an elevated temperature from 100° F. to the boiling point of the alcohol whereby there is insured a high degree of solubility of the oil in the alcohol, thereafter cooling each successive alcohol extraction product to a low temperature to allow 1 to 3% of alcohol to be maintained in the oil settling out, to decrease the solubility of the oil in the alcohol and to obtain extracted oils which show remarkably fine crystal growth and texture when chilled for wax pressing purposes and are free from an amorphous wax formation.

5. In apparatus for extracting hydrocarbons with an alcohol, the combination in operative relation of an extraction mixing coil, means for introducing alcohol into the same, means for introducing hydrocarbons, means for preheating said alcohol and hydrocarbon, a settling tank adapted to receive a mixture of extracted hydrocarbon and alcohol, a cooling coil connected to said extraction mixing coil for cooling and decreasing the solubility of the hydrocarbon in the alcohol to separate the same, a centrifugal separator between said settling tank and said cooling coil and operatively connected thereto, and means in operative connection with said cooling coil for recovering the separated hydrocarbon and alcohol.

6. An apparatus for extracting hydrocarbons with alcohol, the combination in operative relation of an extraction mixing coil, means for introducing alcohol in the same, means for introducing hydrocarbon, means for preheating said alcohol and hydrocarbon, a settling tank for receiving the extracted product, a centrifugal separator in connection therewith, a cooling coil in connection with said centrifugal separator for cooling and decreasing the solubility of the hydrocarbon in the alcohol to separate the same, and means including a separating tank in operative connection with said cooling coil for recovering the hydrocarbon and alcohol.

In testimony whereof I hereunto affix my signature.

THEODORE A. WERKENTHIN.